(12) United States Patent
Tucker

(10) Patent No.: US 8,142,197 B2
(45) Date of Patent: Mar. 27, 2012

(54) CROSS COUNTRY COURSE RATING SYSTEM AND METHOD

(76) Inventor: John N. Tucker, Lexington, VA (US)

( * ) Notice: Subject to any disclaimer, the term of this patent is extended or adjusted under 35 U.S.C. 154(b) by 1027 days.

(21) Appl. No.: 11/182,884

(22) Filed: Jul. 18, 2005

(65) Prior Publication Data

US 2006/0281062 A1    Dec. 14, 2006

Related U.S. Application Data

(60) Provisional application No. 60/588,800, filed on Jul. 19, 2004.

(51) Int. Cl.
*G09B 19/00* (2006.01)
(52) U.S. Cl. ........................................................ 434/255
(58) Field of Classification Search .................. 434/188, 434/247, 253, 255; 33/700, 701, 755, 756, 33/772
See application file for complete search history.

(56) References Cited

U.S. PATENT DOCUMENTS

| | | | | |
|---|---|---|---|---|
| 3,846,704 A * | 11/1974 | Bessette | .................... | 340/870.28 |
| 4,028,693 A * | 6/1977 | Kuntz | ........................ | 340/323 R |
| 4,156,971 A * | 6/1979 | Currie et al. | ..................... | 33/534 |
| 4,343,315 A * | 8/1982 | O'Leary | ........................ | 600/502 |
| 4,645,458 A * | 2/1987 | Williams | ........................ | 434/251 |
| 5,091,895 A * | 2/1992 | Chatwin et al. | .................... | 368/6 |
| 5,138,589 A * | 8/1992 | Kimbel | .............................. | 368/6 |
| 5,435,315 A * | 7/1995 | McPhee et al. | ................ | 600/483 |
| 6,826,845 B2 * | 12/2004 | Pritchard | ......................... | 33/414 |
| 6,892,470 B2 * | 5/2005 | Olson et al. | ..................... | 33/782 |
| 6,997,882 B1 * | 2/2006 | Parker et al. | ................... | 600/534 |
| 2003/0201909 A1 * | 10/2003 | Hilliard | ......................... | 340/940 |
| 2006/0084850 A1 * | 4/2006 | Spinner et al. | ................ | 600/301 |

OTHER PUBLICATIONS

"Cross Country, Track and Running Analysis", 1998 [retrieved online Dec. 20, 2007].*
"eHow: How to Measure Distance Along a Curved Line", Jun. 2004 [retrieved online Dec. 20, 2007].*
"Wheeler Lakes", Jun. 2003 [retrieved online Dec. 20, 2007].*
"Foghorn Outdoors: California Hiking", Mar. 2003 [retrieved online Dec. 20, 2007].*

* cited by examiner

*Primary Examiner* — Kurt Fernstrom
(74) *Attorney, Agent, or Firm* — Andrew M. Calderon; Roberts Mlotkowski Safran & Cole, P.C.

(57) ABSTRACT

A system and method of rating a cross-country course. The method includes for accurately and consistently measuring a length of a cross-country course and rating a difficultly of the cross-country course.

23 Claims, 4 Drawing Sheets

CROSS COUNTRY COURSE RATING SYSTEM AND METHOD

CROSS REFERENCE TO RELATED APPLICATIONS

The present application claims priority to U.S. Provisional Application Ser. No. 60/588,800 filed on Jul. 19, 2004, which is incorporated by reference in its entirety herein.

FIELD OF THE INVENTION

The invention generally relates a course difficulty rating system and method for the sport of cross-country and, more particularly, to a method and system for assisting athletes and other participants in assessing performance over cross country courses.

BACKGROUND DESCRIPTION

For a cross country coach to be able to answer an athlete who asks, "how well did I race today?", the coach needs to know a few things in addition to that athlete's time and place in the race. In order to be able to evaluate any cross country performance relative to a universal standard the coach needs to have two more pieces of information.
1) an exact and standardized course length, and
2) some way of quantitatively knowing the difficulty of the course.

For the same reason, identical race times run on different courses are seldom equivalent performances. Comparing them objectively also requires the same additional information. However, currently there are no known systems which are capable of providing such information.

The invention is directed to overcoming one or more of the problems as set forth above.

SUMMARY OF THE INVENTION

In an aspect of the invention, a system and method of rating a difficulty of a course is provided. The system and method includes a mechanism for accurately and consistently measuring a length of a cross country course and for rating a difficultly of the cross country course.

DETAILED DESCRIPTION OF EMBODIMENTS OF THE INVENTION

The invention is directed to a rating system and, more particularly, to a cross country course rating system to assist athletes in assessing performance. By, for example, 1) scientifically measuring and comparing the difference in energy costs between subjects running at a controlled speed for a typical race distance (5 k, 8 k etc) on a track and then again for the same distance on an accurately measured cross country course, an objective rating (or degree of difficulty) of cross country courses can be determined, and by 2) statistical comparisons between race performances by the same athletes on accurately measured cross country courses and those performed on tracks. Course ratings will enable performances on any rated course to be objectively compared to those on any other rated course, or converted to a common denominator, e.g., an equivalent track time. A cross country performance becomes universally understandable once converted to its track equivalent in accordance with the invention. Put a bit differently, it answers that athlete's question this way: "If you had run with the same energy today but on a track (the common denominator), you would have run a . . . " Until now, cross country coaches were only able to make approximations by guessing, for lack of any way to accurately and objectively compare race performances.

By using the present invention, performances on rated courses now can be intelligibly compared by use of the invention. Teams and individuals can see if they ran faster than their rivals, or if they improved from one week to the next, even if on a slower and more difficult course. Coaches can identify the actual per mile or average mile times (or other averages such as, for example, kilometer times) and more accurately determine training paces for workouts. Recruiting and other will take on a new dimension. There will be many uses of this tool.

The system herein described can be integrated into current on-line systems over a network which may include the Internet, an intranet, an extranet, WAN, LAN, satellite or wireless communications, and/or the like. The invention could be used in conjunction with any type of personal computer, network computer, workstation, minicomputer, mainframe, or the like running any operating system. The invention may be embodied as a computer program product. Accordingly, the invention may take the form of an entirely software embodiment, an entirely hardware embodiment, or a combination thereof. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

System of the Invention

Figure 1:
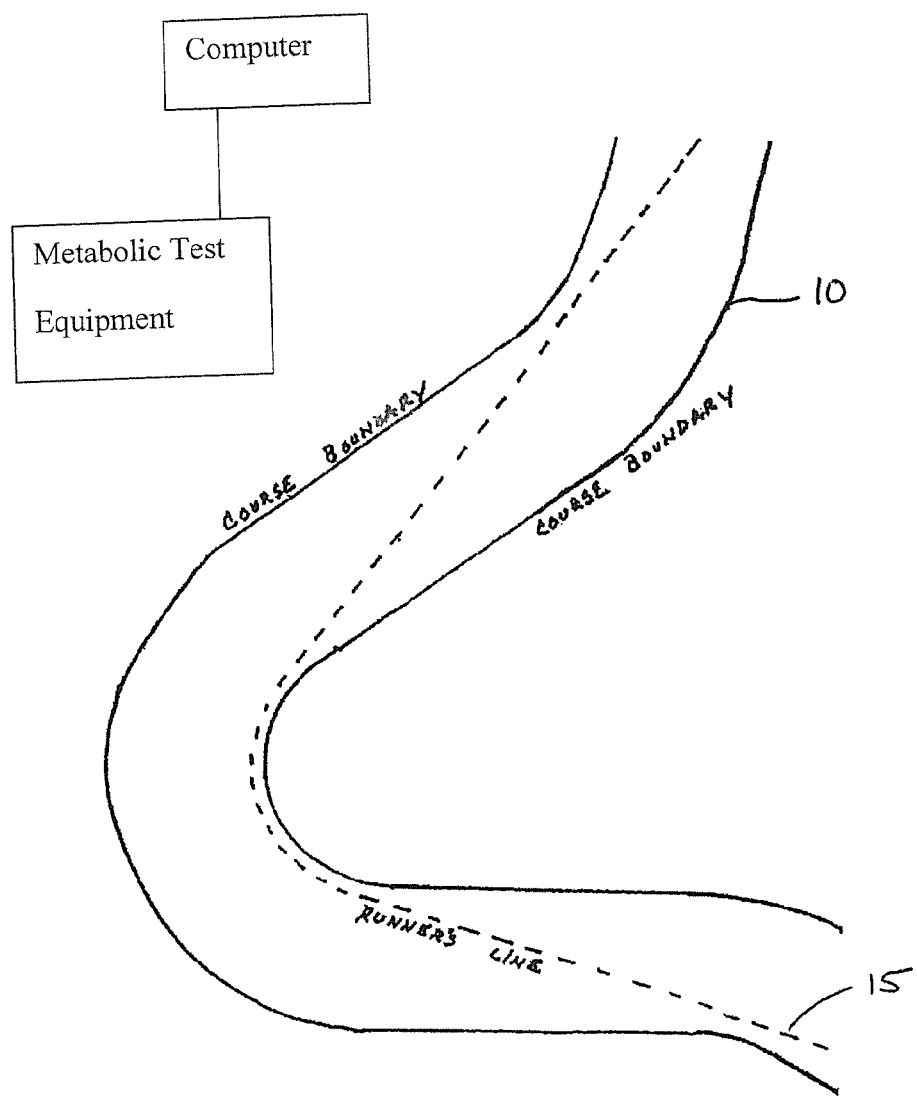
FIG. 1 represents a system and method for measuring a course in accordance with the invention.
Figure 2:
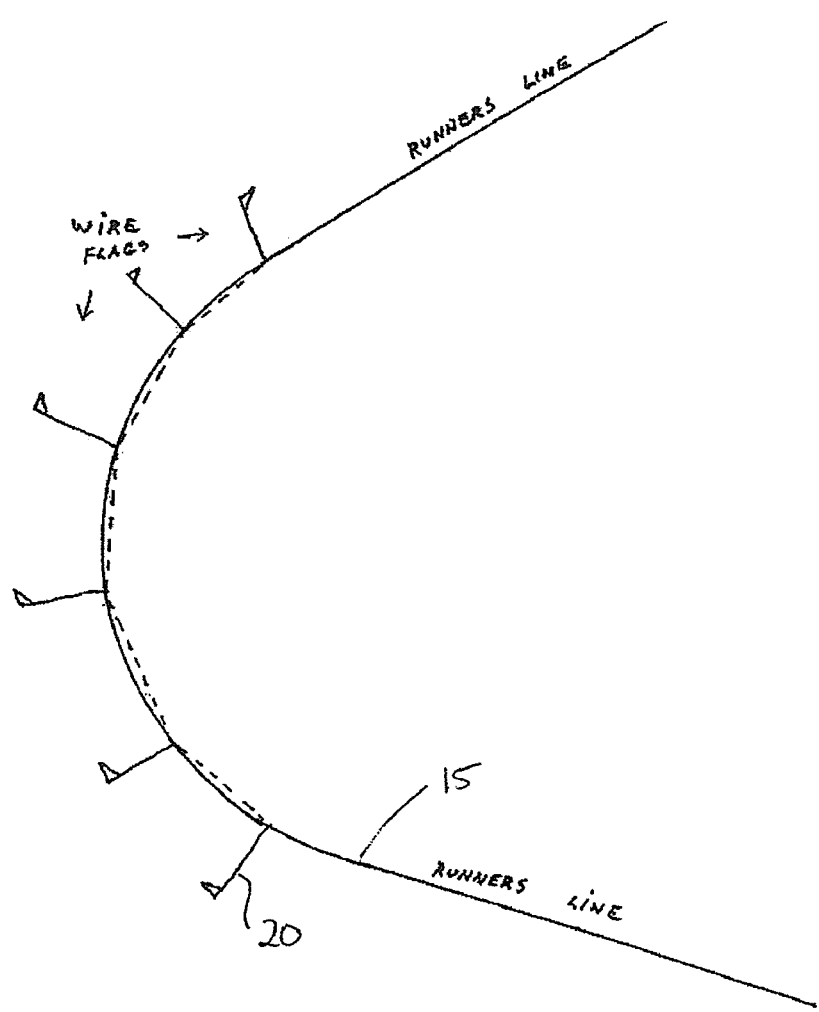
FIG. 2 represents a system and method for measuring a course in accordance with the invention.
Figure 3:
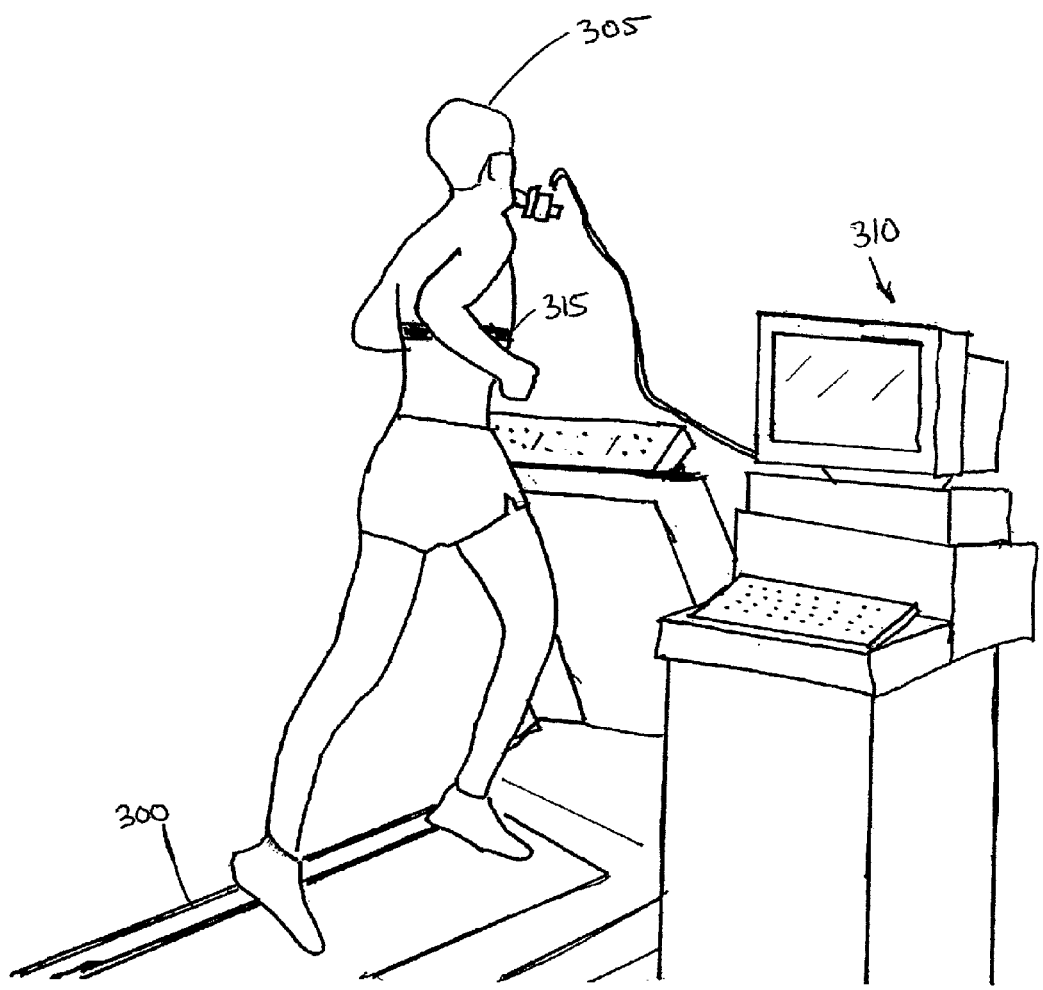
Figure 4:
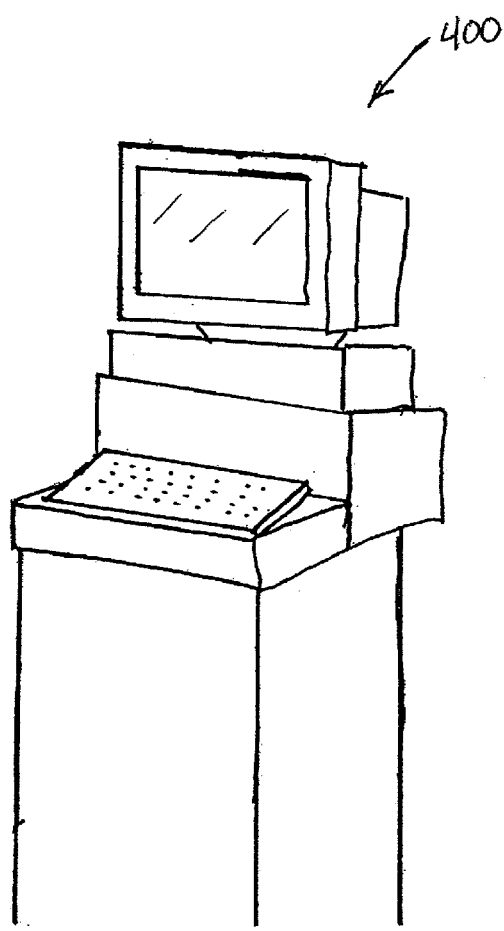

Referring to FIGS. 1 and 2, accurate and standardized course measurements can be achieved by, for example:
1) Painting a line or placing other indicia (referred generally now as painted lines) (either solid and continuous or broken at certain intervals, such as 20' spacing ) on the most direct route a runner could take (or runner's line 15) within the boundaries of the course 10, not the center line (see FIGS. 1 and 2). The lines should be as straight as possible between curves, curves are painted smoothly and actually where the runner will run, not on the innermost boundary of the course.
2) Pulling a standard roll up tape measure, a surveyor's tape or other measuring device (typically used to measure throws in track and field events) in predetermined segments such as, for example, 50 m segments, on the above mentioned painted line from the start to finish, being careful to pull out slack and as much as possible, keeping the tape on the runners line around curves.

It should be understood that the tape, itself, may act as the straight line indicia. The paint or other indicia as noted in 1) may thus be eliminated. The tape should preferably reflect the stride of the runner, which may or may not follow the contour of the ground. There should be no measured segment less than 6 feet (e.g., the approximate average stride length of a runner) that is not straight.

As shown in FIG. 1, for example, the runners' line 15 is typically, in embodiments:
  not centered on the course,
  tangent from one curve to the next,
  straight lines between curves, and
  8" to 10" from inside the course boundary 10 on curves.

As shown in FIG. 2, in order to measure the curves, set wire restraining flags 20 or other indicia on the runners' line 15 may be used to maintain tape on the curve. It is necessary that the spacing between the flags remain small on curves and, in one embodiment, a maximum of six feet apart, since the more flags, the better.

In one embodiment, the flags are angled so that the tape is held to the ground and stays on the runners' line 15. Also, in order to provide test subjects other necessary information at each 50 m interval or other predetermined length, a visual mark such as paint or wire flag is placed on the course. It is recommended that the exact number of 50 m segments (for example 160 for an 8 k, 100 for 5 k etc) be marked in numerical sequence on flags or brightly painted stakes and placed in sequence at each 50 m mark. Of course, other methods may be used for marking, which will save time later.

In embodiments, two people, one at each end of the tape are required, and will communicate with each other, so that they can adjust the tape to the correct spot, pull out slack, clear snags, etc. It is also recommended that these people use hands free headsets and cell phones to do this as you will have your hands full, not to mention a back pack and/or ATV.

It will not be uncommon for a person to see a length discrepancy when first measuring the course. However, it is recommended that the measuring continue until the rated distance is reached (5 k, 8 k etc). The difference between what your course length was and the new rated distance is noted. It may be advisable to adjust the location of start or finish lines. Adjusting for this difference will be an easy process of adding or subtracting from known segments to the new start or finish line.

Although it is preferable to have a course that is exactly 8 k or 5 k for example from start to finish, in many cases, space limitations or topographical constraints force courses to be odd distances. Most in fact are odd distances. It is not necessary for a course to be exactly 8 k, or 5 k in order for the course rating to be applied to race performances as long as the exact length of the course is known. Once the exact length of a course is determined, race performances on them can be converted to the nearest classic race distance such as 5 k or 8 k etc. In embodiments, it is preferable for testing purposes to run the course tests at exact 8 k or 5 k lengths starting and finishing on the flat for a minimum of 100 m. Course length adjustments will be a part of almost every course rating, (see Using the Data). It may also be necessary to mark the track with paint/cones etc. the 50 m or other predetermined segments for testing subjects on the track.

Energy Data Collection/Comparison

Running tests to determine and compare energy costs for either the track or cross country course are accomplished in the same or similar fashion. There are several methods of determining energy costs in running tests implemented by the invention.

The first uses standard laboratory fitness evaluation using a treadmill (commonly referred to as a "VO$_2$ max" or "stress" test) and records physiological data of subjects running at increasing speeds and inclinations on a treadmill until voluntary termination. Data from those laboratory tests are collected and regression equations generated for each subject from which energy costs can be calculated from heart rate (HR) and other data on subsequent running tests on courses and tracks.

Difficulty ratings are the percentages of energy used by runners on cross country courses above what the same runners used on tracks for substantially identical distances, at substantially identical speeds, in similar conditions, within a defined contemporaneous period. Running tests, either track or course, are not to be done on consecutive days by the same subject.

The second method of calculating energy cost in running tests (if available) uses a portable metabolic testing unit (such as the "K-4b2" brand mobile metabolic testing system) which eliminates the need for laboratory testing of subjects and allows energy comparisons to be accomplished directly from tests on the track and course. Course and track tests using the mobile units are accomplished in the same fashion as the method just mentioned above.

A third method utilizes comparisons of actual race performance statistics on tracks and rated courses. This statistical method compares the cross country and track race performances of the same athlete over a same course in substantially the same weather conditions. Although this statistical method quite accurately identifies course difficulty and could be used alone to determine course ratings, it is used primarily to corroborate the energy method. It should also be pointed out that the statistical method can be used on any accurately and consistently measured course, preferably using the invented system's standardized course measurement methods.

By way of example, if an athlete averages 15:30 for several 5 k races on a track, then runs 16:30 on a system measured cross country course in roughly the same weather conditions, then the course difficulty rating is a 6.45. This is calculated by taking the percentage difference between the average time of 15:30 and that of the system measured course of 16:30, which results in 6.45%, e.g., the percentage increase of 990 seconds above 930 seconds. The more these actual race statistics are collected from the same athlete(s) running identical or converted distances on tracks and cross country courses, the more accurate the difficulty rating becomes.

Laboratory Method of Measuring Energy

It should be understood that the following example is illustrative of the overall method implemented by the invention. The lab protocol discussed below is a standard human performance laboratory testing procedure. For example, a 10 k pace may be used to determine fastest sub-maximal run on the treadmill, but other paces may equally be used such as, for example, 5 k, etc. Also, the intervals described below may also be modified in accordance with the principles of the invention.

Treadmill protocol for each subject should include the following, for example. A current (estimated, if not known) 10 k race pace will be used to determine the fastest sub-maximal run on the treadmill. In this method:

a. The current 10 k pace will be converted to a velocity of running in meters per minute (10,000 m/min=m/min) must convert min:sec to minutes.
  b. Select from this list of velocities, the one that is closest to 10 k pace 190, 210, 230, 250, 270, 290, 310, 330, 350 meters per minute.
  c. Count back 3 velocities from the 10 k race pace and that velocity will be the first (and slowest) test pace.
  d. The second test pace will be the next faster velocity from the list, and the third will be the next faster. The 10 k pace will be the 4$^{th}$ sub-max test pace.

e. Each sub-max run will last 5 minutes (although, other time periods may also be used), with $VO_2$, HR, and RPE (Borg Rating of Perceived Exertion) recorded during the $5^{th}$ minute of each run.

f. There will be 2 minutes rest between each sub-max run(although, other time periods may also be used).

The $VO_2$ max test will be conducted as follows a. The first minute of this test will be at 10 k pace (final sub-max pace).

b. Each minute after the first, 1% grade will be added to the treadmill.

c. The subject will continue until reaching voluntary termination.

d. HR and $VO_2$ will be monitored throughout the max test and the highest full minute of $VO_2$ will be taken as max; highest HR will be HR max.

In methods of the invention, run velocity (v), $VO_2$, and HR will be plotted and regression equations generated relating these variables so that HR can predict its related $VO_2$. $VO_2$max and HR max will be used in the regressions related to velocity, resulting in a $VO_2$max (velocity associated with $VO_2$max). Of course, these plots and regression equations can equally be implemented using other times and distances, in accordance with the invention.

Track and Course Tests

With 50 m segments, for example, now clearly marked on the track and course, HR data from runners is collected in the following manner:

1) Have the runners warm up for 10 minutes, as one example, with easy jogging. After warming up, be sure the HR monitors are reading, but not yet recording. When all appears ready, have subjects begin recording HR data and running at the prescribed speed at the sec/50 m test speed shown in the test speed tables which is closest to 70% of each subject's predicted velocity at $VO_2$ max.

2) Speed is controlled by programming a countdown timer watch to sound a beep at the exact sec/50 m speed each runner is to run. If using other distances, the beep or other notification will be provided accordingly. Have subjects adjust their pace so they arrive at the 50 meter marks simultaneously with the pre set beep. (See sec/50 m pacing table). If available, test speeds can also be controlled using newer generation golf carts with programmable speed control technology. Select a test speed from the pacing table for each subject that is between 65-70% of predicted velocity at $VO_2$max as determined for each subject in their lab test. If the selected % of $VO_2$ is halfway between two speeds in the pacing table, select the lower speed, in embodiments. If using the mobile physiological data unit, select a speed that causes a heart rate range as close to but not less than 140 BPM, for example, on the track test. The speed selected for a subject will be used for all that subject's running tests on the course or track.

The following is a table of test speeds. It should be understood that this is one example of test speed using a 50 m pacing system. This can equally be implemented for other predetermined lengths.

| SEC/50 M PACING TABLE FOR TEST SPEEDS |
|---|
| 10 sec/50 m = 26:40 min (8k) or 5:19/1600 or 11.17 mph |
| 11 sec/50 m = 29:20 min (8k) or 5:51/1600 or 10.15 mph |
| 12 sec/50 m = 32:00 min (8k) or 6:24/1600 or 9.28 mph |
| *-continued* |
| SEC/50 M PACING TABLE FOR TEST SPEEDS |
| 13 sec/50 m = 34:40 min (8k) or 6:55/1600 or 8.58 mph |
| 14 sec/50 m = 37:20 min (8k) or 7:27/1600 or 7.97 mph |
| 15 sec/50 m = 40:00 min (8k) or 8:00/1600 or 7.43 mph |
| 16 sec/50 m = 42:40 min (8k) or 8:31/1600 or 6.97 mph |

In one implementation, the track or course tests should be on non-consecutive days, and should preferably not follow a lab test day. Also, the test, as much as possible, should be accomplished in similar and favorable (or prevailing) weather conditions and at the same time of day. This requirement will necessitate testing be completed within a few weeks, preferably within the same season of the year. Testing should be held on days where temperature variance does not exceed 10 degrees, by example. Some consideration on weather and time to completion of running tests should:

a. wait for weather conditions as similar and favorable as possible, and/or b. make all running tests as contemporaneous as possible without testing on consecutive days.

In embodiments, simultaneously testing of as many subjects as practical is preferred, but a minimum of three athletes, together, is most preferable. Also, it is preferable, but not limiting, to test as many running per subject as practical for each course being rated but a minimum of two course tests per subject with a minimum of three subjects running simultaneously may be desirable. Also, the track test should be performed when the subjects are fully rested.

Portable Metabolic Energy Collection

Testing of subjects on the track and cross country course using the mobile metabolic systems will be accomplished in the same fashion as the above methods except that there is no need to include the laboratory segment since the mobile unit itself records the necessary physiological data directly from the course and track tests from which energy can be calculated.

Using the Data

Once the course, track and lab test data are collected, energy costs may be computed and compared. From each subject's lab test, individual fitness profiles are established from which the amount of energy required at a given heart rate can be found. Or if the mobile units are utilized, energy values are measured and compared directly from track and course tests.

Energy costs from course tests, reflected as a percentage above that subject's track test will be the course rating. For example, a course rating of 4.99%, for example, means that it took, on average, 4.99% more energy (usually reflected in kcals) for those subjects tested to run on a given course than it took them to run at the same speed for the same distance on a track. It also means that had that runner run the substantially same distance with the substantially same energy on a track, in the substantially same conditions, it would have been about 4.99% faster. Corresponding changes in velocity relative to changes in energy affecting total time in seconds can be determined using existing human physiologic performance formulas. The energy velocity correlations discussed herein are published in "Oxygen Power" by Jack Daniels, et al., 1979 (see, page 97, for example).

If a course has a length discrepancy (is long or short of the rated length), race performances on that course should be adjusted to reflect the rated length (e.g., exactly 8 k) before the rating can be applied accurately. Most courses (even rated ones) are short or long to some degree, but once measured by the method described above, the performance/length adjustment can be made easily using the following formula:

$$T = \frac{(R \times P)}{L}$$

where, T is the adjusted time of the performance in total seconds corrected for length, R is the rated distance of the course in meters (e.g., 8000 m ), P is the actual performance in total seconds on the long/short course, and L is the actual length of the course in meters (e.g., 7835 m for an "8 k" course which is 165 meters short).

Checking for Accuracy

Testing the accuracy of calculated performance equivalences can be done using the various published track race equivalence tables. Track equivalence tables tell us that if an athlete can run a race at one track distance in a certain time, he/she should be able (within a statistically valid margin) to run another track race distance in a certain other time. Utilizing the tables helps check the accuracy of the cross country course rating system which basically predicts the same thing by converting cross country performances to their equivalent performance on a track.

While the invention has been described in terms of preferred embodiments, those skilled in the art will recognize that the invention can be practiced with modification within the spirit and scope of the appended claims.

It is claimed:

1. A difficulty rating system, comprising:
   means for accurately and consistently measuring a length of a running course comprising a tape measure or surveyor's tape for measuring the running course in discrete, uniform segments throughout the running course and visual markers for marking the running course at an end of each of the discrete, uniform segments throughout the running course; and
   metabolic testing equipment to monitor and record physiological data of subjects to compare energy costs between subjects running at controlled speeds for an exact distance on the running course and corresponding race distance on a track at the controlled speeds and a computer which determines a percentage of increased energy costs used by the subjects running on the track and the running course, which is a difficulty rating of the running course.

2. The system of claim 1, wherein the means for accurately and consistently measuring the running course includes indicia placed in a substantially straight line between curves on the course and a line which is tangent from one curve to a next curve, and a predetermined distance from an inside boundary on the curve.

3. The system of claim 2, wherein the means for accurately and consistently measuring the running course includes indicia about a curve in segments of approximately no more than 6 feet in average.

4. The system of claim 2, wherein the straight line includes the visual markers placed at a predetermined spacing on the course for visual cue.

5. The system of claim 4, wherein the visual markers are marked in numerical sequence at the predetermined spacing.

6. The system of claim 1, wherein a laboratory fitness evaluation system includes the metabolic testing equipment configured to record the physiological data of subjects running at increasing speeds and inclinations on a treadmill until voluntary termination.

7. The system of claim 6, wherein data from the laboratory fitness evaluation system is configured for generating regression equations for each participant from which the energy costs are calculated from heart rate data on subsequent running tests.

8. The system of claim 1, wherein the metabolic testing equipment is a portable metabolic testing unit for determining the energy costs for accomplishing energy comparisons directly from tests on the running course.

9. A difficulty rating system, comprising:
   means for accurately and consistently measuring a length of a running course comprising a tape measure or surveyor's tape for measuring the running course in discrete, uniform segments throughout the running course and visual markers for marking the running course at an end of each of the discrete, uniform segments throughout the running course; and
   a computer having a storage medium and which determines a difficulty rating of the running course by calculating a percentage of increased time difference between actual race performance of the subject on tracks and actual race performance of the subject on the accurately measured running course.

10. A method comprising:
    accurately and consistently measuring a length of the running course by measuring the course in discrete, uniform segments throughout the running course using a tape measure or a surveyor's tape and marking the running course at an end of each of the discrete, uniform segments throughout the running course using visual markers;
    calculating energy costs from course tests using metabolic testing equipment which monitors and records physiological data of subjects and a computer which determines a difficulty rating for the accurately measured running course using an energy comparison testing, wherein the difficulty rating is reflected as a percentage of a difference in energy costs between subjects running at a controlled speed for a known race distance on a track and for a same distance at the controlled speed on the accurately measured running course.

11. The method of claim 10, wherein the measuring the running course includes placing indicia in a substantially straight line between curves on the course and a line which is tangent from one curve to a next curve, and a predetermined distance from an inside boundary on the curve.

12. The method of claim 11, wherein the measuring the running course includes placing the indicia about a curve in segments of approximately no more than 6 feet in average.

13. The method of claim 10, wherein the rating the difficulty of the running course using the energy comparison testing includes providing a laboratory fitness evaluation configured to record physiological data of subjects running at increasing speeds and inclinations on a treadmill until voluntary termination.

14. The method of claim 13, wherein data from the laboratory fitness evaluation includes generating regression equations for each participant from which energy costs are calculated from heart rate (HR) data on subsequent running tests.

15. The method of claim 10, wherein the rating the difficulty of the running course using the energy comparison testing includes providing a portable metabolic testing unit to determine the energy costs for accomplishing energy comparisons directly from tests on the running course.

16. A method of rating a difficulty of a running course, comprising:

accurately and consistently measuring a length of the running course by measuring the course in discrete, uniform segments throughout the running course using a tape measure or a surveyor's tape and marking the running course at an end of each of the discrete, uniform segments throughout the running course using visual markers;

calculating energy costs from subjects running on an accurately measured running course and course tests which use results of metabolic testing equipment which monitors and records physiological data of the subjects; and determining a difficulty rating for the accurately measured running course using a statistical comparison using a computer having storage medium, wherein:

actual race performance statistics of a subject on tracks and actual race performance statistics of the subject on the accurately measured running course are compared; and the difficulty rating is determined as a percentage difference in the compared actual race performance statistics of the subject on tracks and the actual race performance statistics of the subject on the accurately measured running course.

17. The method of claim 10, wherein the rating the difficulty of the running course using the energy comparison testing includes:

determining test velocity speeds from laboratory test data relative to velocity at $VO_2$ max on a treadmill; and identifying a test speed on a test speed table by selecting a speed on the test speed table which is closest to about 70% of predicted velocity at $VO_2$ max that a test subject achieves in a laboratory stress test, wherein each test subject runs all course and track tests at test speeds that would have them arrive at a predetermined visual or audible cues at selected seconds per predetermined intervals.

18. The system of claim 1, wherein the running course is a cross-country course.

19. The method of claim 10, wherein the running course is a cross-country course.

20. A difficulty rating system, comprising a tape measure or surveyors tape for accurately and consistently measuring a length of a running course; and a laboratory fitness evaluation system using a treadmill and metabolic test equipment which records physiological data of subjects running at increasing speeds and inclinations on the treadmill until voluntary termination; and a computer which:

generates regression equations for each subject based on the data from the laboratory fitness evaluation system and metabolic test equipment and which is used to calculate energy costs based on the regression equations and heart rate (HR) data of each subject on subsequent running tests.

21. A difficulty rating system, comprising:

a tape measure or surveyor's tape for accurately and consistently measuring a length of a running course; and metabolic testing equipment which monitors and records physiological data of subjects to calculate energy costs from course tests on an accurately measured running course; and a computer which determines a difficulty rating for the accurately measured running course, reflected as a percentage of a difference in the energy costs between subjects running at a controlled speed for a known race distance on the course tests and for a same distance at the controlled speed on the accurately measured running course.

22. A method of rating a difficulty of a running course implemented on a computer and taking the form of a computer program product on a computer readable storage medium, comprising:

rating a difficulty of the running course using an accurately and consistently measured length of a running course, wherein the rating the difficulty of the running course includes:

providing a laboratory fitness evaluation using a treadmill configured to record physiological data of subjects running at increasing speeds and inclinations on the treadmill until voluntary termination;

generating regression equations for each participant based on data from the laboratory fitness evaluation; and calculating energy costs based on the regression equations and heart rate (HR) data of each subject on subsequent running tests.

23. A method of rating a difficulty of a running course implemented on a computer and taking the form of a computer program product on a computer readable storage medium, comprising:

calculating energy costs from course tests; and determining a difficulty rating for an accurately measured running course using an energy comparison testing, wherein the difficulty rating is reflected as a percentage of a difference in energy costs between subjects running at a controlled speed for a known race distance on a track and for a same distance at the controlled speed on the accurately measured running course.

\* \* \* \* \*